(12) United States Patent
Ksontini et al.

(10) Patent No.: US 7,487,349 B2
(45) Date of Patent: Feb. 3, 2009

(54) METHOD FOR SECURING A CIPHERED CONTENT TRANSMITTED BY A BROADCASTER

(75) Inventors: Rached Ksontini, Lausanne (CH); Henri Kudelski, Grandvaux (CH); Cédric Groux, Chexbres (CH)

(73) Assignee: NagraCard S.A., Cheseaux-sur-Lausanne (CH)

( * ) Notice: Subject to any disclaimer, the term of this patent is extended or adjusted under 35 U.S.C. 154(b) by 817 days.

(21) Appl. No.: 10/830,063

(22) Filed: Apr. 23, 2004

(65) Prior Publication Data

US 2005/0238170 A1 Oct. 27, 2005

(51) Int. Cl.
*H04L 9/12* (2006.01)
*H04N 7/167* (2006.01)

(52) U.S. Cl. .............. 713/163; 380/281
(58) Field of Classification Search ........... 713/163
See application file for complete search history.

(56) References Cited

U.S. PATENT DOCUMENTS

| | | | | |
|---|---|---|---|---|
| 5,592,552 A | * | 1/1997 | Fiat | 713/163 |
| 5,748,736 A | * | 5/1998 | Mittra | 713/163 |
| 6,035,038 A | * | 3/2000 | Campinos et al. | 380/228 |
| 6,049,878 A | * | 4/2000 | Caronni et al. | 726/3 |
| 6,263,435 B1 | * | 7/2001 | Dondeti et al. | 713/163 |
| 6,880,081 B1 | * | 4/2005 | Itkis | 713/163 |
| 2002/0126847 A1 | * | 9/2002 | Wajs et al. | 380/255 |

* cited by examiner

*Primary Examiner*—Matthew Heneghan
(74) *Attorney, Agent, or Firm*—Harness, Dickey & Pierce, PLC

(57) ABSTRACT

A method is for protecting an encrypted content, by use of at least one encryption key. The method includes generation of a temporary encryption key, encryption by the temporary key of a value allowing the determination of the encryption keys of the content, transmission of the encrypted value to a multimedia unit, and encryption and transmission of at least two cryptograms including the temporary key encrypted by an authorization key. The first cryptogram is encrypted by a first authorization key pertaining to a first security module and the second cryptogram is encrypted by a second authorization key pertaining to a group of security modules whose first security module is excluded.

20 Claims, 5 Drawing Sheets

METHOD FOR SECURING A CIPHERED CONTENT TRANSMITTED BY A BROADCASTER

BACKGROUND

This invention concerns the domain of security for security modules, these modules being intended to contain personal and secret data allowing access to services or benefits.

This invention applies more precisely to the Pay-TV domain, in which a content is transmitted in an encrypted form, the decryption of these content being authorized under determined conditions.

It is well known that in order to watch a Pay-TV event, such as a film, a sports event or a game in particular, several streams are diffused to a multimedia unit, for example to a decoder. These streams are in particular, on one hand the file of the event as an encrypted data stream and on the other hand, a stream of control messages allowing the decryption of the data stream. The content of the data stream is encrypted by "control words" (cw), which are regularly renewed. The second stream is called ECM stream (Entitlement Control Message) and can be formed in two different ways. According to a first way, the control words are encrypted by a key, called transmission key TK that generally pertains to the transmission system between the management center and a security module associated with the receiver/decoder. The control word is obtained by decrypting the entitlement control messages by means of the transmission key TK.

According to a second way, the ECM stream does not directly contain the encrypted control words, but contains data allowing the determination of the control words. Said determination of the control words can be carried out through different operations, in particular by decryption, this decryption being able to lead directly to the control word, which corresponds to the first way described above. But the decryption can also lead to data that contains the control word, said control word still having to be extracted from the data. In particular, the data can contain the control word as well as a value associated to the content to be diffused, and in particular the access conditions to these content. Another operation allowing the determination of the control word can for example use a one-way hash function of this piece of information in particular.

The security operations are generally carried out in a security module associated to the multimedia unit or to the decoder. This type of security module can be produced in particular according to four different forms. One of these consists in a microprocessor card, a smart card, or more generally an electronic module (taking the form of a key, of a badge, . . . ). This type of module is generally removable and connectable to the decoder. The most used form is the one with electric contacts, but does not exclude a connection without contact, for example of the ISO 14443 type.

A second known form consists in an integrated circuit chip, generally placed in the decoder shell in a definitive and irremovable way. An alternative is made up of a circuit wired on a base or connector such as a SIM module connector.

In a third form, the security module is integrated into an integrated circuit chip that also has another function, for example in a descrambling module of the decoder or the microprocessor of the decoder.

In a fourth embodiment, the security module is not realised as a hardware, but rather its function is implemented only as software. Given that in the four cases the function is identical although the security level differs, it will be talked of security module regardless of the way in which its function is realized or the form that can be taken by this module.

At the time of the decryption of a entitlement control message (ECM), it is verified if the right to access to the content in question is present in the security module. This right can be managed by authorization messages (EMM=Entitlement Management Message), which load this right into the security module.

The diffusion of conditional access digital data is schematically divided into three modules. The first module handles the encryption of the digital data by the control words cw and the diffusion of this data.

The second module prepares the control messages ECM containing the control words cw, as well as the access conditions and diffuses them for the users.

The third module prepares and transmits the authorization messages EMM that handle the definition of the reception rights in the security modules connected to the receivers.

While the first two units are generally independent from the addressees, the third module manages the set of users and diffuses data for one user, for a group of users or for all the users.

One of the methods used to bypass security, that is laborious but workable, consists in analysing the content of an authorized security module (reverse engineering) in order to imitate the security part (decryption of the messages) and at the same time bridge the verification part of the rights. It is thus possible to produce a "clone" of a real security module. This clone will thus have the transmission key that will allow it to decrypt the control words cw contained in the control messages ECM. Since the rights are not verified in this clone, it will operate as the original as far as the decryption means are concerned, but without needing to have the rights to carry out this decryption.

In a Pay-TV system, it is possible to change the transmission key. In principle, two methods can be used for this. The first consists in diffusing the new destination transmission key to all the decoders. Said decoders can then be updated so that when the new key is used, they can decrypt the events. This type of updating does not allow the exclusion of a cloned decoder because it can also receive the updating messages since it has corresponding decryption keys.

Since each security module includes at least one single key, the second approach consists in transmitting the new transmission key in an encrypted message using this single key. In this case, the number of messages is at least equal to the number of installed security modules in order to renew individually this transmission key. It is known that if a module is released (that is to say if the host apparatus is not supplied), it will not receive this message and could not offer any further services to the user, to which he or she would have by legitimate right. To compensate for this, when a message is sent to a module, this message is repeated several times to be sure that the addressee has received it.

Given the available bandwidth and to ensure that each subscriber has received the new key, it is necessary to transmit the message well before the use of this new key, for example one month in advance.

Therefore, the possessor of a clone module will inform the technician that has supplied him with this clone and has means to extract the new transmission key from an authentic module. When the key is available, for example on the Internet, all the clones can then be updated before the activation of the new key. In this way, the clones are always operational.

As a result, the sending of transmission keys by global transmission as well as by individual transmission has drawbacks and does not allow the elimination of a cloned module.

SUMMARY

The aim of this invention is to propose a method to prevent the abusive use of conditional access data, in particular by means of security module clones whose security has been compromised.

This aim is reached by a method for protecting an encrypted content by means of at least one encryption key and transmitted by a diffuser to at least one multimedia unit associated to a security module, a value allowing the determination of the encryption key(s) of this content also being transmitted to the multimedia unit by said diffuser, said security module comprising the means to determine the encryption key on the basis of said value, this method comprising the following steps:

generation of a temporary encryption key (MCW),
encryption by the temporary key (MCW) of the value allowing the determination of the encryption keys (cw) of the content;
transmission of this encrypted value to said multimedia unit,
encryption and transmission of at least two cryptograms comprising the temporary key (MCW) encrypted by an authorization key (G), the first cryptogram being encrypted by a first authorization key pertaining to a first security module and the second cryptogram being encrypted by a second authorization key, which pertains to a group of security modules whose first security module is excluded.

The aim of this invention is also reached by a method for protecting an encrypted content by at least one encryption key and transmitted by a diffuser to at least one multimedia unit associated to a security module, a value allowing the determination of the encryption key(s) of this content also being transmitted to the multimedia unit by said diffuser, said security module comprising means to determine the encryption key on the basis of said value, this method comprising the following steps:

generation of said value allowing the determination of the encryption keys;
transmission to the multimedia unit of said value allowing the deduction of the encryption key (cw) of the content,
generation of a temporary encryption key (MCW),
transformation, by the temporary key (MCW) of the value allowing the determination of the encryption keys of the content, said transformation giving as a result said encryption key (cw) of the content;
encryption and transmission of at least two cryptograms comprising the temporary key (MCW) encrypted by an authorization key (G), the first cryptogram being encrypted by a first authorization key pertaining to a first security module and the second cryptogram being encrypted by a second authorization key, which pertains to a group of security modules whose first security module is excluded.

The method of the invention enables to carry out a pseudo-individual encryption of messages and at the same time avoids the necessity of encrypting the same message with each personal key of each security module. This allows to permit the decryption of a decryption key only by the non-cloned modules and to forbid the decryption of such a key by the clones, so that they will not be able to decipher the future data.

One of the aims of the invention consists in combining the "individual" encryption of a decryption key of the data, with the frequent change of this key. These two notions are a priori incompatible because of the fact that it is necessary, for individual encryption, to transmit a number of messages equal to the number of security modules, which as a consequence occupies a large bandwidth at the time of the transmission. This characteristic is incompatible with the frequent change of the key, which is a condition for optimal security.

The proposed solution consists in integrating into the authorization messages ECM, not the control words that have been used to encrypt the data, but modified control words, from which it is possible to determine the original control words, on the condition that the security module has a valid key that has not been revoked. In this invention, the determination of the original control words cw can be carried out if the security module receives "authorization data". The revocation of a security module is carried out by simply not sending the authorization data in question.

A stream, that can be the entitlement management message stream EMM or another specific stream, transmits this "authorization data", which will allow the security modules to decrypt the modified control words and deduce the control words cw, in order to be able to decrypt the content.

The authorization data used to encipher these control words cw is formed by means of keys organized according to a tree structure in which the highest level is made up of unique keys for each security module, the lower levels being made up of keys common to a security module group, and so on. The more the level descend, the more the number of security modules per group increases. In this way, a collection of specific keys is associated to each security module.

This plurality of keys associated to different groups of security modules allows a finer addressing of the "authorization data", and also thus allows the reduction of the bandwidth needed for the transmission of this "authorization data".

This has the advantage that it is possible to change the encryption key more frequently than in the conventional systems, for example every 1 to 5 minutes, so that possible pirates have no time to obtain the key and to diffuse it to other pirates. Furthermore, when a security module has been used for the production of a clone, it is possible to identify this security module by determining its key collection. It is then simple to revoke this security module and this clone.

BRIEF DESCRIPTION OF DRAWINGS

The invention will be better understood thanks to the following detailed description, which refers to the enclosed drawings given as a non-limitative example, in which.

DETAILED DESCRIPTION OF DRAWINGS

Figure 1:
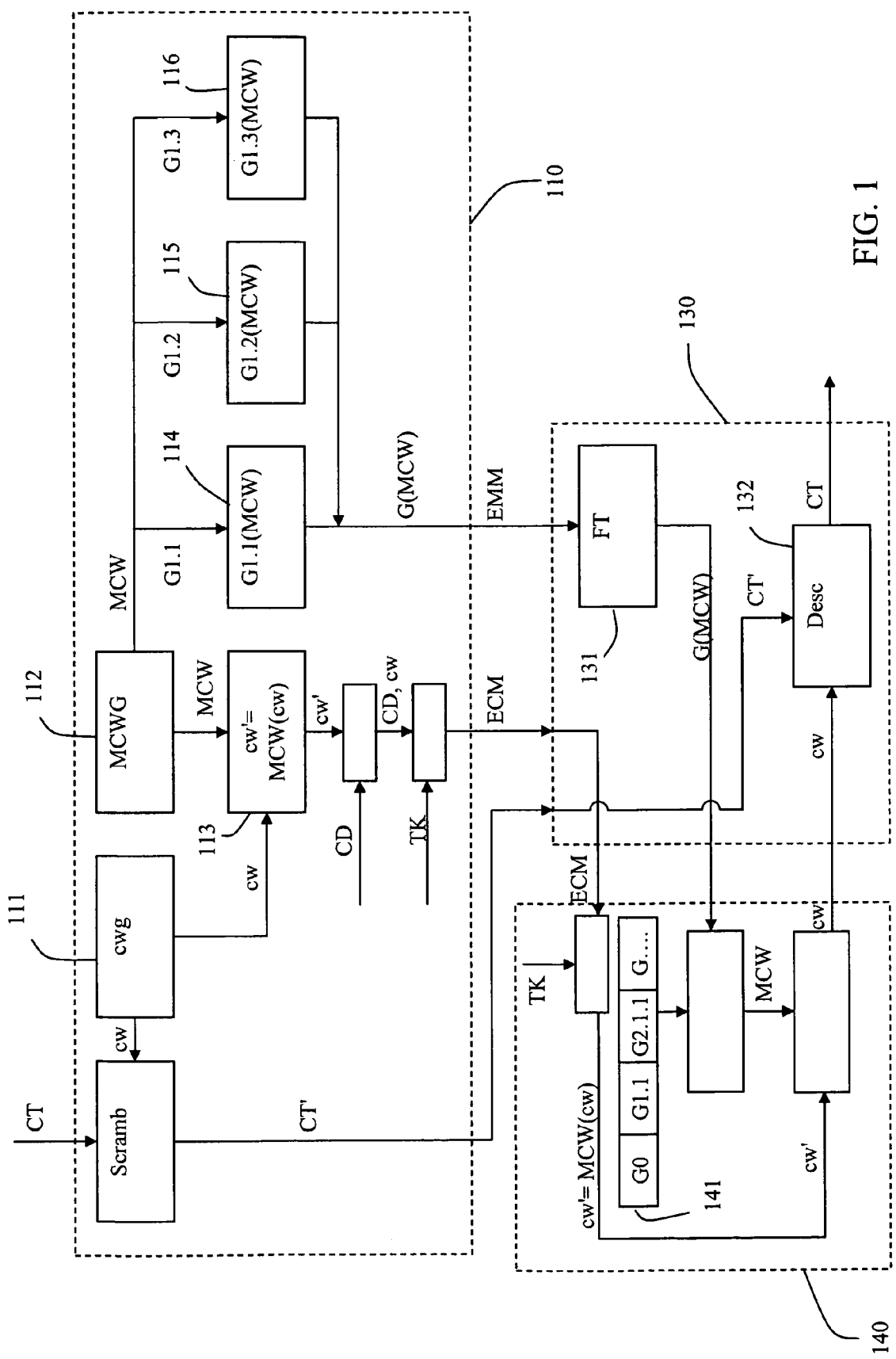
FIG. 1 shows schematically the data encryption and decryption according to a first embodiment of the process of the invention.
Figure 2:
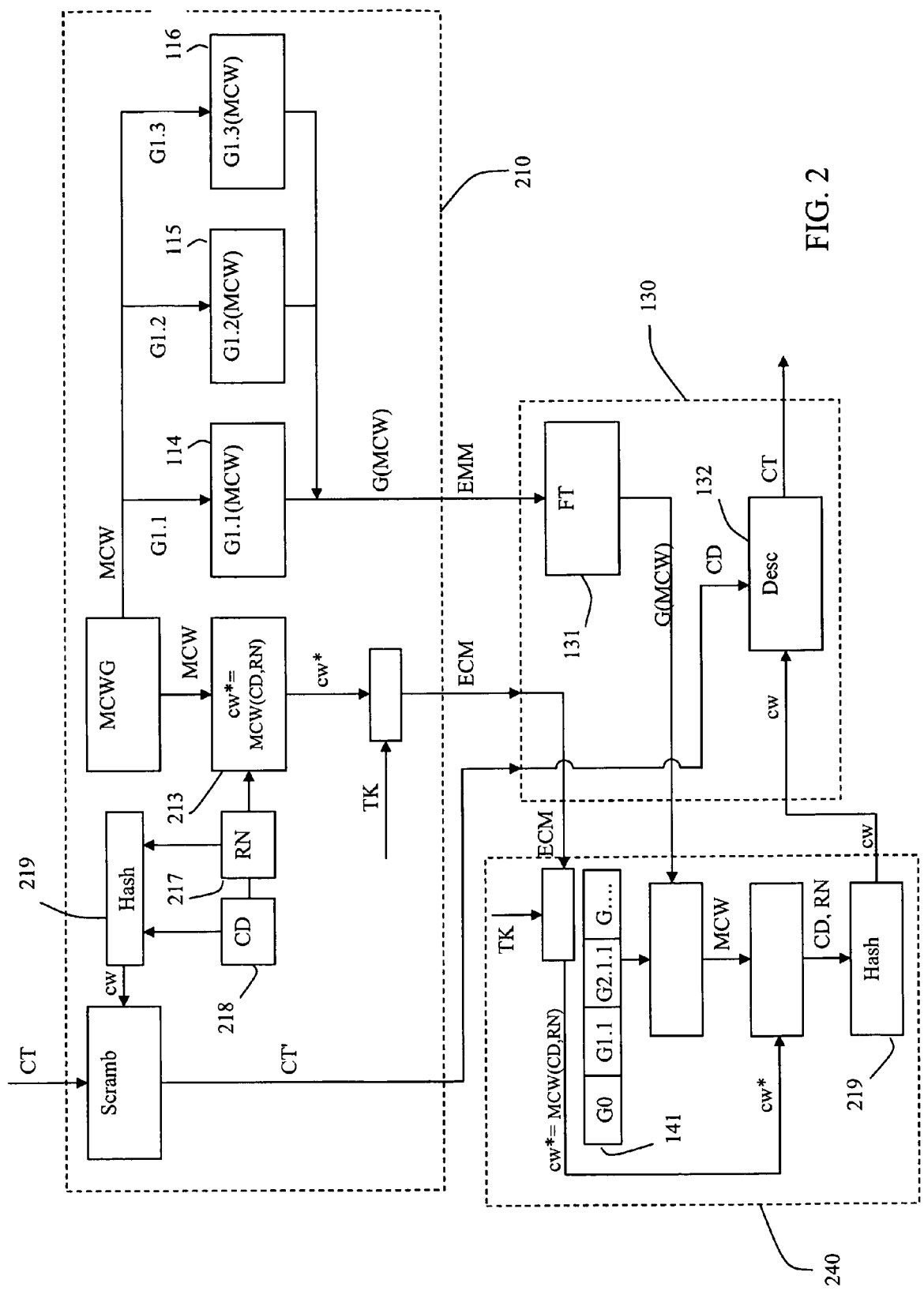
FIG. 2 shows the data encryption and decryption according to a second embodiment of the process of the invention.
Figure 3:
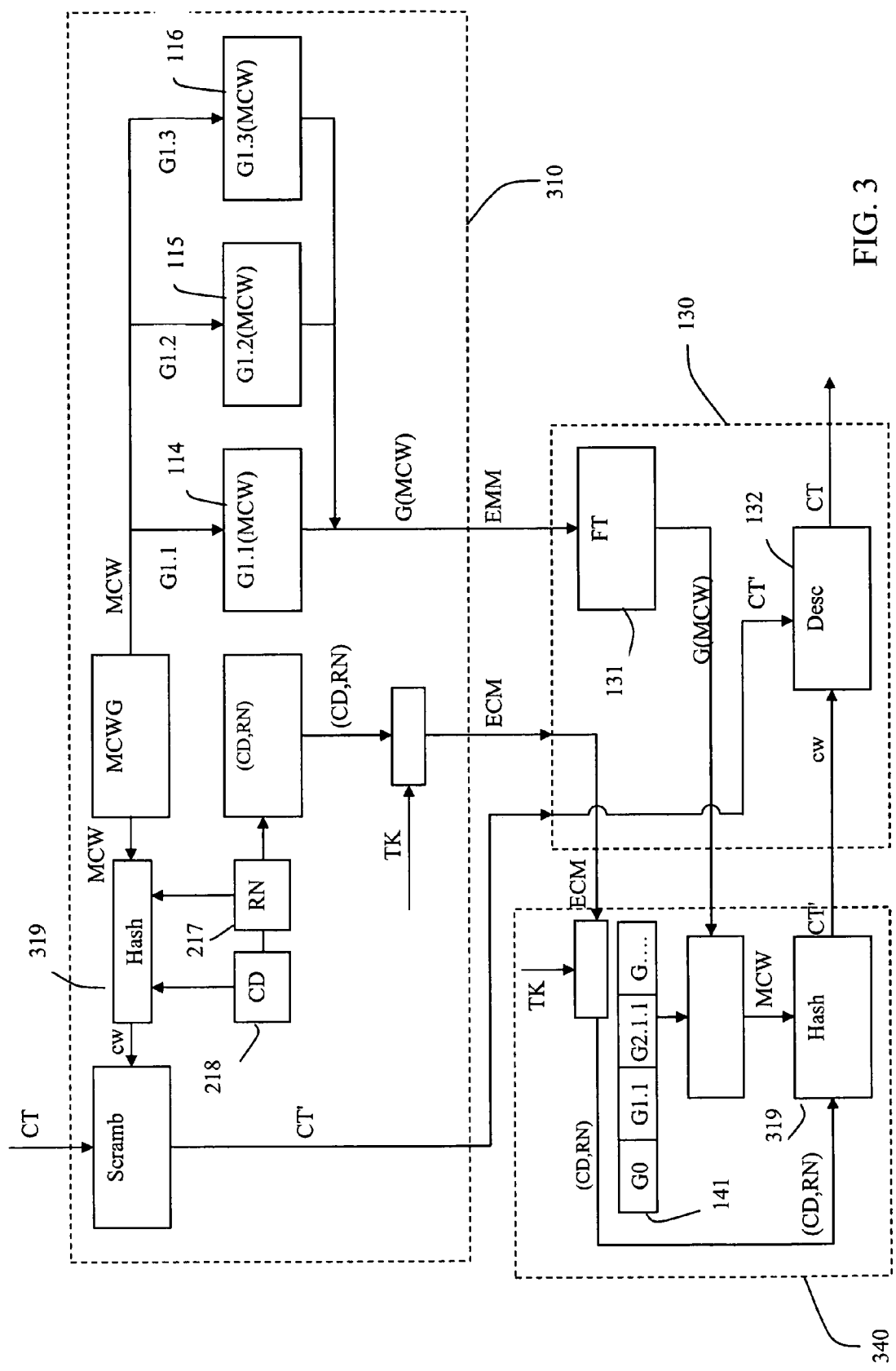
FIG. 3 shows the data encryption and decryption according to a third embodiment of the process of the invention.

FIGS. 1 to 3 illustrate the implementation of the process according to the invention, the encryption side as well as the decryption side. The encryption is carried out at the level of the management center 110, which sends streams to decoders 130 associated to a security module 140 that handles the decryption of the data.

As shown in FIG. 1, the management center 110 generates three streams, which are detailed below.

This management center 110 first generates, in a control words generator cwg 111, control words cw that are used for a first time in a conventional way for the encryption of a content CT to be diffused. The content CT is encrypted during a step referenced as Scramb. These content is transmitted as an encrypted data stream CT'=cw(CT). As it is well known, the control words are changed at regular intervals, for example every 2 to 10 seconds, although other intervals can be considered.

When the control words are generated, they are also encrypted by a temporary encryption key, generated in principle in a random way by a generator MCWG 112, and called master control word MCW. Modified control words cw'=MCW(cw) are thus obtained. These master control words are also changed at regular intervals, for example every 1 to 10 minutes. Other durations can also be used.

In the embodiment of FIG. 1, the modified control words cw' are formed 113, particularly by adding the access conditions CD to the content and a header. They are then encrypted by means of the transmission key TK before their diffusion as conventional control messages ECM.

It can be noticed that it is also possible to add the access conditions CD to the control word and to encrypt the set with the master control word MCW. This would allow the possibility of not using encryption by the transmission key TK.

At the same time, the master control word MCW is encrypted by several different keys to be sent to the different non-revoked groups of security modules. These encryptions are carried out with keys G, called authorization keys and are described in more detail hereafter. Each security module 140 in fact includes several authorization keys, some of them being unique and different for each module, others being common to several modules. The authorization keys are introduced into the security modules 140 at the time of their personalization.

When the master control word MCW is encrypted by an authorization key G, an authorization block G(MCW) is obtained. These authorization blocks 114-116 are diffused either in a specific stream, or in an entitlement management message stream EMM.

Thus, the decoders receive three streams: the encrypted data stream CT', the entitlement control messages ECM and the authorization blocks G(MCW). The stream of entitlement control messages ECM is filtered in a conventional way and processed by the security module 140 so that the modified control words cw' are extracted. To that effect, it is first necessary to decrypt the message by means of the transmission key TK.

At the same time, the EMM type stream or another stream containing the authorization blocks received by a decoder is filtered in a filter FT 131 and processed so that the authorization block pertaining to this decoder is extracted. The latter is then transmitted to its security module 140. The authorization block G(MCW) is decrypted by means of one of the authorization keys G 141, which allows the deduction of the master control word MCW. The latter is then used to decrypt the modified control word cw', which allows the determination of the control word cw used for the encryption of the content. Thus, the content can be decrypted in a descrambling module Desc 132. Therefore, the content CT is obtained in clear.

Referring to the embodiment showed in FIG. 2, in the management center 210, first of all a variable element RN 217 is generated, which can be advantageously a random or a pseudo-random value. According to an alternative, another element depending on the content can also be joined to the variable element, this other element being able for example to be linked to the access conditions CD of these content 218. In a first instance, an operation 219 is carried out on the variable element RN 217 with or without the element CD 218 depending on the content. This operation can be a one-way hash function or another cryptographic operation. The result of this operation is the control word cw that will be used for the encryption of the content.

The variable element RN 217 with or without the access conditions CD 218 is encrypted by the master control word MCW in order to give the modified control words cw* 213. These are then processed as in the embodiment in FIG. 1, that is to say they are encrypted by the transmission key, formed and diffused as control messages.

The master control words MCW are also encrypted by authorization keys G and diffused in an authorization messages stream EMM or in another specific stream, to arrive at the decoders.

For the decryption of the encrypted content CT', the security module 240 processes the control messages ECM in order to extract the modified control word cw*. It also processes the authorization messages G(MCW) in order to extract the master control word MCW. The latter is then used to extract the variable element RN, possibly with the element CD depending on the content, from the modified control word cw*. Operation 219, which is the same operation as the one used at the management center 210 to generate the control words cw from the variable element RN 217, is applied to the extracted elements, the variable element RN 217 and possibly the element depending on the content CD 218. The control words cw thus obtained could be used to decrypt the encrypted content CT' in order to obtain the content CT in clear.

Referring to the embodiment of FIG. 3, in the management control center 310, the control words cw are generated from a variable element RN 217, for example a random element with a possible element CD 218 depending on the data access conditions. In the following description, in order to simplify, it is supposed that an element depending on the content is used and that this element is linked to these content's access conditions. In practice, an element, which does not depend on the access conditions or only the variable element can be used.

As previously, master control words MCW are also generated. Then the variable element RN 217 and the access conditions CD 218 are subjected to operation 319 depending on the master control words MCW. This type of operation is typically a hash operation with key, the key being the master control word. The result of this operation is the control word cw used for the encryption of the content CT.

The variable element RN and the access conditions CD are encrypted by the transmission key TK, formed and sent as a control message ECM to the decoder. The authorization blocks containing the master control words encrypted by means of the authorization keys G 114, 115 and 116 are also transmitted to the decoder.

The security module 340 associated to the decoder extracts the variable element RN and the access conditions CD. It also decrypts the master control words MCW. From these elements, it applies operation 319, which is the same operation used to create the control words in the management center 310, this operation being, in the described example, a hash function with key, the key being the master control word. The control words cw are thus obtained and then used to decrypt the encrypted content CT'.

According to the process of the invention, in order to revoke a security module, it is necessary to determine the set of authorization keys present in the module to be revoked, then it is necessary to use none of the keys of the module to be revoked to generate authorization blocks. In other words, revoking a security module and its clones corresponds to revoking all the authorization keys that are present in the security module in question. On the other hand, it is necessary to use the keys of the non-revoked modules to generate the authorization blocks needed for the proper functioning of these non-revoked modules. With reference to optimizing bandwidth use, it is not possible or desirable to send encrypted authorization blocks with a single key for each security module. In fact, as the number of security modules to be managed becomes larger, the available bandwidth will probably be insufficient. To solve this problem, each security module contains, as previously indicated, a plurality of authorization keys G. These keys are organized according to a tree structure described in detail with reference to FIG. 4.

Figure 4:
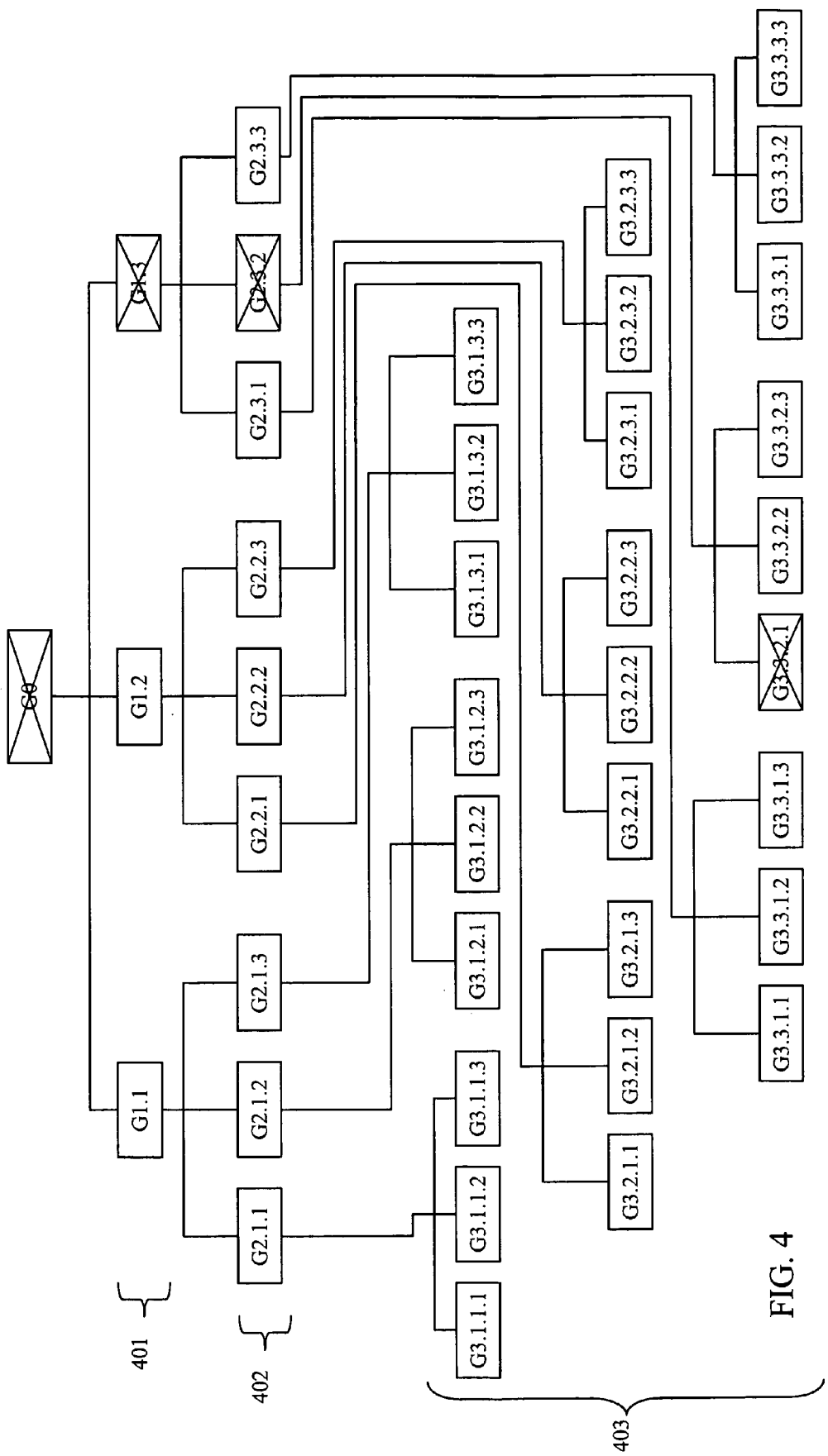
FIG. 4 describes the hierarchical structure of the keys used in the invention.

FIG. 4 shows an embodiment in which 27 different security modules 403 are managed. These modules are divided up into nine groups of three elements 402. These nine groups of three elements are also grouped into three groups 401. The principle of the invention is strictly the same, regardless of the size of the groups. In FIG. 4 all the authorizations keys distributed in the 27 security modules are represented. The system in FIG. 4 has four key levels, which means that each security module contains four authorization keys. One of these keys, referenced as G0 in FIG. 4 is common to $3^3$ thus to 27 security modules, which represents the totality of the modules in the example in question. This key is used to encrypt the master control words MCW as long as no security module is to be revoked, thus forming an authorization block G(MCW).

A second authorization key, called level 1 key and referenced as G1 in the Figure is common to a group of 32 thus 9 security modules. Therefore, three keys of level 1 are necessary to cover the set of 27 security modules. In the Figure, these keys have G1 as reference followed by 1, 2 or 3, each corresponding to a group of 9 security modules.

A third authorization key, called level 2 key, with the reference G2, followed by 1, 2 or 3 of the $1^{st}$ level group to which it belongs and followed by 1, 2 or 3 corresponding to the second level group. A second level key is common to $3^1$, that is to say 3 security modules.

Furthermore, the security modules contain a $3^{rd}$ level authorization key, with the reference G3, this reference also containing the identifiers of the $1^{st}$ and $2^{nd}$ level groups, followed by 1, 2 or 3. This key is common to $3^0$, that is to say 1 security module. In other words, these level 3 keys are unique for each security module.

Therefore, according to the level of the key, a key is common for $3^0=1$ security module, $3^1=3$ modules, $3^2=9$ modules and $3^3=27$ modules. As previously indicated, the explained embodiment example is limited to 27 decoders, for the clarity of the illustration. In practice, groups formed by a power of 2 modules can be used, for example of 16 security modules, with for example 7 levels keys, that is to say a collection of 7 keys loaded in each security module, which would allow the management of more than 16 million modules.

Figure 5:
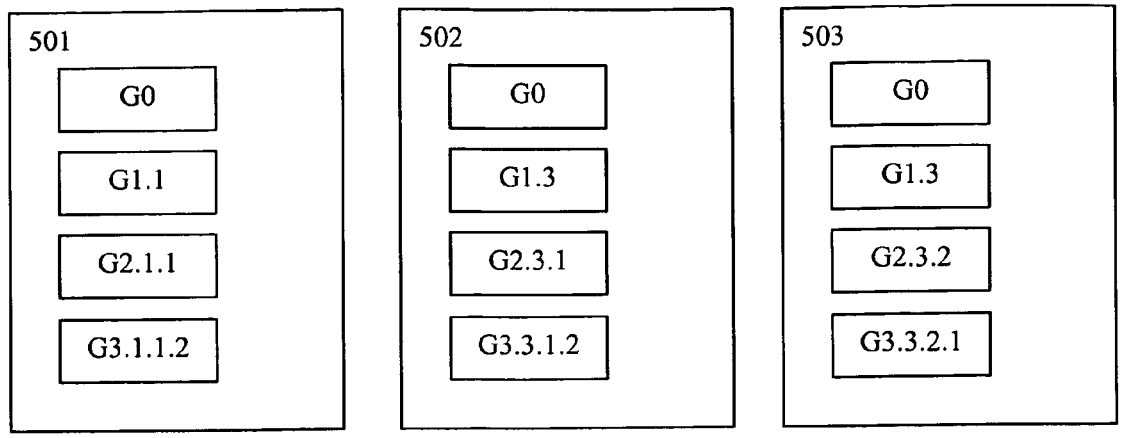
FIG. 5 shows an example of the keys contained in certain security modules.

As showed in FIG. 5, all the security modules 501, 502 and 503 contain, according to a determined hierarchy, the authorization key G0 of level 0, one level 1 key, one level 2 key and one level 3 key. It should be noted that, in order to ensure the security of the security modules, the keys that they contain are preferably not sent in a message, but are loaded in the factory during a module personalization stage.

In normal operating conditions, that is to say when all the security modules are active, the authorization data is systematically encrypted by the global key G0 known by all the security modules, as previously explained.

When the use of the global key G0 is no longer desired, for example when one of the security modules is considered to be a clone and therefore must be revoked, the authorization blocks are only encrypted with the authorization keys of level G1, excluding of course the G1 level key which is present in the module to be revoked. As the revoked key G1 is shared by several security modules, the level of the used key is lower only for the modules which have the same key G1 as the module to be revoked and the authorization blocks are encrypted with the G2 level keys, except with that who is contained in the module to be revoked. This process is iterative until the used key is that of the final level which corresponds to a unique key for each security module.

Figure 6A:
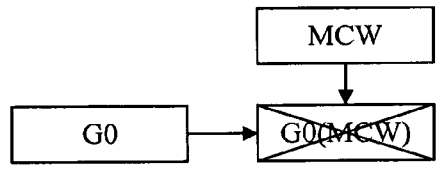
FIGS. 6a to 6g represent schematically the messages transmitted by the diffuser to the security modules.
Figure 6B:
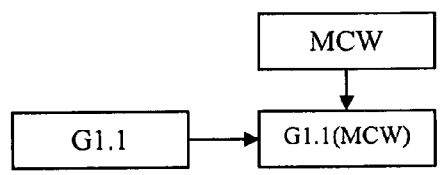
Figure 6C:
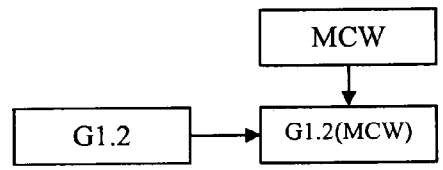

To explain the process according to the invention referring to FIG. 4, it is supposed that the security module having the unique authorization key G3.3.2.1 is considered as a clone and that the right for this module to decrypt the data must be denied. Since this module belongs to the group having the authorization key G0, as all the modules, it is no longer possible to use this key G0, as schematically represented in FIG. 6a. Also the module to be revoked belongs to the group having the first level G1.3 key. Thus, this authorization key must no longer be used. The suppression of the key G0 for decryption prevents all security modules from decrypting data, which is obviously not desired. In order to allow the correct functioning of the non-revoked modules, it is necessary to use another authorization key. In practice, one will use the valid encryption keys for the group containing the largest possible number of security modules, provided this group does not contain the module to be deactivated. According to this rule, the key G0 is no longer used, but the first level keys G1.1 and G1.2 can be used, since the module to be deactivated, having the G3.3.2.1 unique key, does not belong to the group having these $1^{st}$ level keys. The encryption and the sending of the master control word MCW encrypted with these $1^{st}$ level keys are schematically showed in FIGS. 6b and 6c respectively.

Figure 6D:
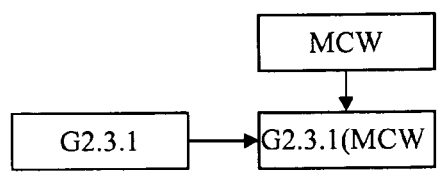
Figure 6E:
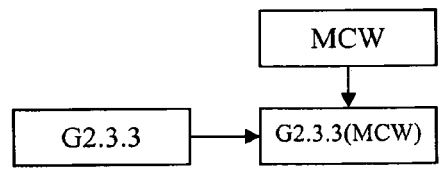
Figure 6F:
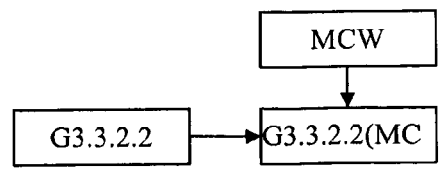
Figure 6G:
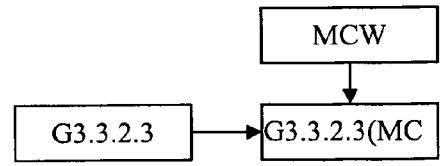

Thus, by sending encrypted messages using two different authorization keys, namely G1.1 and G1.2, all the modules belonging to these groups, which correspond to 18 modules, function correctly. The G1.3 key has not been used because the module to be deactivated belongs to the group using this G1.3 key. The effect of this is to render unusable the 9 modules belonging to this group. The module to be blocked belongs to the group having the $2^{nd}$ level G2.3.2 key. Therefore, the other keys of the $2^{nd}$ level are used, namely G2.3.1 and G2.3.3, as shown in FIGS. 6d and 6e respectively, without using G2.3.2. This has the effect of blocking three modules namely those having the G3.3.2.1, G3.3.2.2 and G3.3.2.3 keys. Only one of these modules must be blocked. In order to allow the functioning of the other two modules, the G3.3.2.2 and G3.3.2.3 keys are used, as shown in FIGS. 6f and 6g, which only prevents the module to be eliminated from decrypting any further data. Therefore, in the described embodiment example, in order to deactivate a security module, it is necessary to use two keys from level 1, two keys from level 2 and two keys from level 3, that is to say 6 keys, for a total of 27 security modules. It should be noted that in a conventional system, it would be necessary to encrypt the messages with 26 different keys to allow the functioning of all the modules except one.

By extension, it can be demonstrated that if the number of levels is called K, that is to say the number of authorization keys stored in each security module, and n is the number of security modules per group, the number of manageable modules is equal to $n^{(\kappa-1)}$ and the number of keys to be used for the elimination of a module among these $n^{(\kappa-1)}$ modules is equal to $(n-1)*(\kappa-1)$. In an embodiment where the number of modules per group is 16 (n=16) and has 7 keys levels (κ=7), 90 authorization data must be sent, using 90 different authorization keys to isolate a module among more than 16 million modules (16'777'216 precisely).

The number of keys to be used to isolate a second module depends on the relation between the two modules to be eliminated or, in other words, on their relative position in the tree structure shown in FIG. 4. The most favourable case corresponds to two modules to be eliminated belonging to the same group of the penultimate level, that is to say, with reference to FIG. 4, two modules having the same second level key G2. In this case, the number of keys to be used corresponds to one less than that needed for the elimination of a single module, namely $[(n-1)*(\kappa-1)]-1$ in the general case, 89 keys in the context of the groups of 16 modules distributed in 7 levels and 5 keys in the embodiment example in FIG. 4.

The most unfavourable case is when the two modules have as unique common key, the level 0 key G0. In this case, the number of different keys to be used is equal to $(n-2)+2(n-1)(\kappa-2)$ in general that is to say 164 keys in the context of the groups of 16 modules distributed in 7 levels and 9 keys in the embodiment example in FIG. 4.

This invention is particularly interesting because the number of messages to be encrypted with different keys can be extremely reduced. Therefore, it is possible to change frequently the master control word, for example once a minute, so that possible acts of piracy can be deterred.

In order to use as less keys as possible and accordingly to generate as less messages as possible, the keys common to the largest possible number of security modules are used, excluding at the same time the module to be deactivated. Therefore, referring to FIG. 4, the G1.1 key will be used rather than the 3 keys G2.1.1, G2.1.2 and G2.1.3. Nevertheless, this process also operates by using these three keys, however without minimising the number of messages to be transmitted.

As previously indicated, the security modules contain several authorization keys. When a security module receives a message, it can be decided that the lowest possible level key will have to be used. For example, if a module receives an encrypted message by means of a level 1 key and a level 3 key, the level 1 key will have to be used to decrypt the message. It is possible to provide other means to determine the key to be used, these means should allow the knowledge of the level of the key to be used.

It should be noted that the master control words MCW are generally the same for several channels. This allows fast decryption when the user changes channel. However, it is also possible to use different master control words MCW, this is generally the case when the encryption is carried out by various providers.

The invention claimed is:

1. A method for securing access to a content, encrypted by an encryption key, transmitted from a broadcaster to a plurality of multimedia units, each of which is associated with a security module comprising at least one unique authorisation key and at least two group authorisation keys, said method allowing the broadcaster to selectively revoke access rights from at least one of said security modules, this method involving the organisation of said security modules into a hierarchical tree of at least two levels of groups, the first of said levels comprising a plurality of security modules which share a common group authorisation key, the second of said levels comprising at least two groups of the first level groups of security modules each sharing a further common group key, said method comprising the following steps:

generation of a temporary encryption key, generation of a value allowing the determination of the encryption key of the content, encryption under the temporary encryption key of said value, transmission of the encrypted value to the plurality of security modules, transmission of the content, encrypted under the encryption key, to the plurality of security modules, encryption and transmission of at least two cryptograms each comprising the temporary encryption key, the first cryptogram being encrypted under the unique authorisation key of a non-revoked security module and the second cryptogram being encrypted by a group authorisation key pertaining to a group of security modules to which the revoked security module does not belong, decryption, by at least one of the non-revoked security modules, of at least one of the plurality of cryptograms using either one of the group authorisation keys or the unique authorisation key to give the temporary encryption key, decryption, by at least one of the non-revoked security modules, of the encrypted value using the temporary encryption key to give the encryption key, decryption, by the multimedia unit associated with at least one non-revoked security module, of the encrypted content using the encryption key to get clear content.

2. Method according to claim 1, wherein said value allowing the determination of the encryption key of the content is the encryption key itself.

3. Method according to claim 2, wherein said value allowing the determination of the encryption key of the content includes at least one variable element and said encryption key is built from this variable element.

4. Method according to claim 3, wherein said encryption key is built by means of an encryption function applied at least to said variable element.

5. Method according to claim 1, wherein said value allowing the determination of the encryption key of the content includes at least one variable element and said encryption key is built from this variable element.

6. Method according to claim 5, wherein said value allowing the determination of the encryption key furthermore includes an additional element related to the content in addition to the variable element.

7. Method according to claim 6, wherein said additional element contains conditions of access to the transmitted content.

8. Method according to claim 7, wherein said encryption key is built by means of a hash function applied at least to said variable element.

9. Method according to claim 7, wherein said encryption key is built by means of an encryption function applied at least to said variable element.

10. Method according to claim 6, wherein said encryption key is built by means of a hash function applied at least to said variable element.

11. Method according to claim 6, wherein said encryption key is built by means of an encryption function applied at least to said variable element.

12. Method according to claim 5, wherein said encryption key is built by means of a hash function applied at least to said variable element.

13. Method according to claim 1, wherein the authorization keys are classified in levels, the keys of the highest level being unique and individual for one security module, the key of the lowest level being known by all the security modules and the intermediate level keys being common to a security module subset, this subset not containing all the modules.

14. Method according to claim 13, intended for the revocation of at least one security module, wherein, as a second authorization key intended for the encryption of the temporary key, the keys common to the largest possible group of security modules are used, this group not including the at least one revoked security module.

15. Method according to claim 13, wherein a message is sent to the security modules, indicating the level of the authorization key which must be used.

16. Method for securing access to a content, encrypted by an encryption key, transmitted from a broadcaster to a plurality of multimedia units, each of which is associated with a security module comprising at least one unique authorisation key and at least two group authorisation keys, said method allowing the broadcaster to selectively revoke access rights from at least one of said security modules, this method involving the organisation of said security modules into a hierarchical tree of at least two levels of groups, the first of said levels comprising a plurality of security modules which share a common group authorisation key, the second of said levels comprising at least two groups of the first level groups of security modules each sharing a further common group key, said method comprising the following steps:

generation of a temporary encryption key, generation of a value allowing the determination of the encryption key of the content, transmission of said value to the plurality of security modules, transformation, under the temporary encryption key, of the value allowing the determination of the encryption key of the content, this transformation giving as a result, said encryption key of the content, transmission of the content, encrypted under the encryption key, to the plurality of security modules, encryption and transmission of at least two cryptograms each comprising the temporary encryption key, the first cryptogram being encrypted under the unique authorisation key of a non-revoked security module and the second cryptogram being encrypted by a group authorisation key pertaining to a group of security modules to which the revoked security module does not belong, decryption, by at least one of the non-revoked security modules, of at least one of the plurality of cryptograms using either one of the group authorisation keys or the unique authorisation key to give the temporary encryption key, decryption, by at least one of the non-revoked security modules, of the encrypted value using the temporary encryption key to give the encryption key, decryption, by the multimedia unit associated with at least one non-revoked security module, of the encrypted content using the encryption key to get clear content.

17. Method according to claim 16, wherein said value allowing the determination of the encryption key of the content includes at least one variable element and said encryption key is built from this variable element.

18. Method according to claim 17, wherein said value allowing the determination of the encryption key further includes an additional element in addition to the variable element.

19. Method according to claim 18, wherein said additional element contains the conditions to access to the transmitted content.

20. Method according to claim 16, wherein the transformation is a hash operation with a key, the key being the temporary encryption key.

* * * * *